US006859235B2

(12) United States Patent
Walters (10) Patent No.: US 6,859,235 B2
(45) Date of Patent: ***Feb. 22, 2005

(54) ADAPTIVELY DEINTERLACING VIDEO ON A PER PIXEL BASIS

(75) Inventor: Andrew W. Walters, San Jose, CA (US)

(73) Assignee: WebTV Networks Inc., Mountain View, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 09/858,066

(22) Filed: May 14, 2001

(65) Prior Publication Data

US 2002/0191105 A1 Dec. 19, 2002

(51) Int. Cl.$^7$ .............................................. H04N 7/01
(52) U.S. Cl. ...................................... 348/448; 348/452
(58) Field of Search ................................ 348/448, 452, 348/459, 700

(56) References Cited

U.S. PATENT DOCUMENTS

| 4,679,084 | A | * | 7/1987 | Topper et al. | 348/559 |
|---|---|---|---|---|---|
| 5,235,417 | A | * | 8/1993 | Casavant et al. | 348/452 |
| 5,532,751 | A | * | 7/1996 | Lui | 348/452 |
| 6,404,461 | B1 | * | 6/2002 | Le Clerc | 348/700 |
| 6,459,454 | B1 | * | 10/2002 | Walters | 348/448 |

OTHER PUBLICATIONS

Kenji Sugiyama & Hiroya Nakamura, A Method of De-interlacing with Motion Compensated Interpolation, IEEE Transactions on Consumer Electronics Aug. 1999, vol. 45, No. 3, pp. 611–616.

Regis J. Crinon, Contour–Based Motion Estimation for De–Interlacing Video Sequences, Ninth Annual Conference and Exposition, Anaheim Convention Center, NCGA'88, Technical Sessions, vol. 111, Mar. 20–24, 1988, pp. 607–616.

* cited by examiner

*Primary Examiner*—Victor R. Kostak
(74) *Attorney, Agent, or Firm*—Workman Nydegger (57) ABSTRACT

Adaptive deinterlacing of interlaced video to generate a progressive frame on a per pixel basis. Two consecutive fields of interlaced video are converted into a frame of progressive video. One of the fields is replicated to generate half the lines in the progressive frame. Each of the pixels in the other half of the progressive frame are generated pixel-by-pixel. For a given output position of the pixel in the other half of the progressive frame, a correlation is estimated between the corresponding pixel in the non-replicated field and at least one vertically adjacent pixel of the replicated field, and optionally one or more vertically adjacent pixels in the non-replicated fields. Also, three consecutive input fields of interlaced video may be converted into two output fields of interlaced video on a per pixel basis taking into consideration differences in the consecutive input fields.

37 Claims, 7 Drawing Sheets

|  | COL 0 | COL 1 | COL 2 | COL 3 | COL 4 | COL 5 | COL 6 | COL 7 |
|---|---|---|---|---|---|---|---|---|
| LINE 0 | P00 | P10 | P20 | P30 | P40 | P50 | P60 | P70 |
| LINE 1 |  |  |  |  |  |  |  |  |
| LINE 2 | P02 | P12 | P22 | P32 | P42 | P52 | P62 | P72 |
| LINE 3 |  |  |  |  |  |  |  |  |
| LINE 4 | P04 | P14 | P24 | P34 | P44 | P54 | P64 | P74 |
| LINE 5 |  |  |  |  |  |  |  |  |
| LINE 6 | P06 | P16 | P26 | P36 | P46 | P56 | P66 | P76 |
| LINE 7 |  |  |  |  |  |  |  |  |

|  | COL 0 | COL 1 | COL 2 | COL 3 | COL 4 | COL 5 | COL 6 | COL 7 |
|---|---|---|---|---|---|---|---|---|
| LINE 0 | P00 | P10 | P20 | P30 | P40 | P50 | P60 | P70 |
| LINE 1 |  |  |  |  |  |  |  |  |
| LINE 2 | P02 | P12 | P22 | P32 | P42 | P52 | P62 | P72 |
| LINE 3 |  | X |  |  |  |  |  |  |
| LINE 4 | P04 | P14 | P24 | P34 | P44 | P54 | P64 | P74 |
| LINE 5 |  |  |  |  |  |  |  |  |
| LINE 6 | P06 | P16 | P26 | P36 | P46 | P56 | P66 | P76 |
| LINE 7 |  |  |  |  |  |  |  |  |

|  | COL 0 | COL 1 | COL 2 | COL 3 | COL 4 | COL 5 | COL 6 | COL 7 |
|---|---|---|---|---|---|---|---|---|
| LINE 0 | P00 | P10 | P20 | P30 | P40 | P50 | P60 | P70 |
| LINE 1 | P01 | P11 | P21 | P31 | P41 | P51 | P61 | P71 |
| LINE 2 | P02 | P12 | P22 | P32 | P42 | P52 | P62 | P72 |
| LINE 3 | P03 | P13 | P23 | P33 | P43 | P53 | P63 | P73 |
| LINE 4 | P04 | P14 | P24 | P34 | P44 | P54 | P64 | P74 |
| LINE 5 | P05 | P15 | P25 | P35 | P45 | P55 | P65 | P75 |
| LINE 6 | P06 | P16 | P26 | P36 | P46 | P56 | P66 | P76 |
| LINE 7 | P07 | P17 | P27 | P37 | P47 | P57 | P67 | P77 |

|  | COL 0 | COL 1 | COL 2 | COL 3 | COL 4 | COL 5 | COL 6 | COL 7 |
|---|---|---|---|---|---|---|---|---|
| LINE 0 | P00 | P10 | P20 | P30 | P40 | P50 | P60 | P70 |
| LINE 1 |  |  |  |  |  |  |  |  |
| LINE 2 | P02 | P12 | P22 | P32 | P42 | P52 | P62 | P72 |
| LINE 3 |  | P'13 |  |  |  |  |  |  |
| LINE 4 | P04 | P14 | P24 | P34 | P44 | P54 | P64 | P74 |
| LINE 5 |  |  |  |  |  |  |  |  |
| LINE 6 | P06 | P16 | P26 | P36 | P46 | P56 | P66 | P76 |
| LINE 7 |  |  |  |  |  |  |  |  |

|      | COL 0 | COL 1 | COL 2 | COL 3 | COL 4 | COL 5 | COL 6 | COL 7 |
|------|-------|-------|-------|-------|-------|-------|-------|-------|
| LINE 0 |     |     |     |     |     |     |     |     |
| LINE 1 | P01 | P11 | P21 | P31 | P41 | P51 | P61 | P71 |
| LINE 2 |     |     |     |     |     |     |     |     |
| LINE 3 | P03 | P13 | P23 | P33 | P43 | P53 | P63 | P73 |
| LINE 4 |     |     |     |     |     |     |     |     |
| LINE 5 | P05 | P15 | P25 | P35 | P45 | P55 | P65 | P75 |
| LINE 6 |     |     |     |     |     |     |     |     |
| LINE 7 | P07 | P17 | P27 | P37 | P47 | P57 | P67 | P77 |

505a

|      | COL 0 | COL 1 | COL 2 | COL 3 | COL 4 | COL 5 | COL 6 | COL 7 |
|------|-------|-------|-------|-------|-------|-------|-------|-------|
| LINE 0 |     |     |     |     |     |     |     |     |
| LINE 1 |     |     |     |     |     |     |     |     |
| LINE 2 |     |     |     |     |     |     |     |     |
| LINE 3 |     |     |     |     |     |     |     |     |
| LINE 4 | X   |     |     |     |     |     |     |     |
| LINE 5 |     |     |     |     |     |     |     |     |
| LINE 6 |     |     |     |     |     |     |     |     |
| LINE 7 |     |     |     |     |     |     |     |     |

|      | COL 0 | COL 1 | COL 2 | COL 3 | COL 4 | COL 5 | COL 6 | COL 7 |
|------|-------|-------|-------|-------|-------|-------|-------|-------|
| LINE 0 |     |     |     |     |     |     |     |     |
| LINE 1 | P01 | P11 | P21 | P31 | P41 | P51 | P61 | P71 |
| LINE 2 |     |     |     |     |     |     |     |     |
| LINE 3 | P03 | P13 | P23 | P33 | P43 | P53 | P63 | P73 |
| LINE 4 |     |     |     |     |     |     |     |     |
| LINE 5 | P05 | P15 | P25 | P35 | P45 | P55 | P65 | P75 |
| LINE 6 |     |     |     |     |     |     |     |     |
| LINE 7 | P07 | P17 | P27 | P37 | P47 | P57 | P67 | P77 |

505b

|      | COL 0 | COL 1 | COL 2 | COL 3 | COL 4 | COL 5 | COL 6 | COL 7 |
|------|-------|-------|-------|-------|-------|-------|-------|-------|
| LINE 0 |     |     |     |     |     |     |     |     |
| LINE 1 |     |     |     |     |     |     |     |     |
| LINE 2 |     |     |     |     |     |     |     |     |
| LINE 3 |     |     |     |     |     |     |     |     |
| LINE 4 | P'04 | X  |     |     |     |     |     |     |
| LINE 5 |     |     |     |     |     |     |     |     |
| LINE 6 |     |     |     |     |     |     |     |     |
| LINE 7 |     |     |     |     |     |     |     |     |

ADAPTIVELY DEINTERLACING VIDEO ON A PER PIXEL BASIS

BACKGROUND OF THE INVENTION

1. The Field of the Invention

The present invention relates to the field of digital video. More specifically, the present invention relates to the adaptive conversion of interlaced fields of video into progressive frames on a per pixel basis.

2. The Related Art

Video information may be represented by progressive video or interlaced video. Modem computer monitors typically display progressive video. Conventional television monitors and older computer monitors typically display interlaced video. High definition television may display both interlaced and progressive video.

Progressive video includes a series of frames, where each frame is drawn as consecutive lines from top to bottom. In interlaced video, each frame is divided into a number of fields. Typically, the frame is divided into two fields, one field containing half of the lines (e.g., the even numbered lines), and the other field containing the other half of the lines (e.g., the odd numbered lines). The interlaced video, however, is still temporally ordered so that neighboring interlaced fields may represent video information sampled at different times.

There is often a need to convert interlaced video into progressive video and vice versa. For example, suppose a television broadcaster transmits a conventional television program as a series of interlaced fields. If these interlaced fields are to be displayed on a modern computer monitor (or on a high definition television display) that displays progressive frames, the interlaced fields must be converted into progressive frames.

The conversion involves using one or more fields of interlaced video to generate a frame of progressive video and repeating the process so that a stream of interlaced video is converted into a stream of progressive video. This conversion is often called "deinterlacing". There are several conventional methods of deinterlacing.

One conventional deinterlacing method is called "scan line interpolation" in which the lines of a single interlaced field are duplicated to form a first half of the lines in the progressive frame. The second half of the lines in the progressive frame are formed by simply duplicating the same field again and inserting the field offset by one line into the second half of the lines to complete the progressive frame. This basic form of scan line interpolation is computationally straightforward and thus uses little, if any, processor resources. However, the vertical resolution of the progressive frame is only half of what the display is capable of displaying.

One variation on the scan line interpolation method is that the second half of the lines in the progressive frame are generated by interpolating (e.g., averaging) the neighboring lines in the interlaced field. This requires somewhat more computational resources, but results in a relatively smooth image. Still, the vertical resolution is only half of what the display is capable of displaying.

One deinterlacing method that improves vertical resolution over scan line interpolation is called "field line merging" in which lines from two consecutive fields are interweaved to form a progressive frame. However, the video information in the first field is not sampled at the exact same moment as the video information in the second field. If there is little movement in the image between the first and second fields, then field line merging tends to produce a quality image at relatively little processing costs. On the other hand, if there is movement between the first and second fields, simply combining fields will not result in a high fidelity progressive frame since half the lines in the frame represent the video data at a given time, and half the lines in the frame represent a significantly different state at a different time.

Higher processing methods use complex motion compensation algorithms to determine where in the image there is motion, and where there is not. For those areas where there is no motion, field line merging is used because of its improved vertical resolution. For those areas where there is motion, scan line interpolation is used since it eliminates the motion artifacts that would be caused by field line merging. Such motion compensation algorithms may be implemented by the motion estimation block of an MPEG encoder. However, such complex motion compensation methods require large amounts of processing and memory resources.

Therefore, what are desired are methods and systems for deinterlacing to provide a relatively high fidelity progressive frame without having to dedicate the processor and memory resources required by complex motion compensation algorithms.

SUMMARY OF THE INVENTION

The principles of the present invention provide for the adaptive deinterlacing of interlaced video to generate a progressive frame on a per pixel basis. In a first embodiment of the present invention, two consecutive fields of interlaced video are converted into a frame of progressive video. One of the fields is replicated to generate half the lines in the progressive frame. Each of the pixels in the other half of the progressive frame are generated pixel-by-pixel.

Specifically, for a given output position of the pixel in the other half of the progressive frame, a correlation is estimated between the corresponding pixel in the non-replicated field and at least one vertically adjacent pixel of the replicated field, and optionally one or more vertically adjacent pixels in the non-replicated fields. In one example, a window of pixels one pixel wide by five pixels high is evaluated centering on the pixel in the non-replicated field that corresponds to the output pixel position.

A value is then assigned to the output pixel that corresponds to the output position, the value depending on the correlation. The deinterlacing in accordance with the present invention interpolates between scan line interpolation and field merging depending on the correlation. For example, if there is a high vertical correlation, then more of field merging is performed for that pixel since a high correlation suggests less likelihood of movement at that pixel position. If there is a low vertical correlation, then more of scan line interpolation is performed for that pixel since a low correlation suggests more likelihood of movement at that pixel position. If there is moderate correlation, a balance of scan line interpolation and field merging is performed. This process is repeated for each pixel in the other half of the progressive frame until the entire progressive frame is generated.

Thus, unlike pure scan line interpolation or pure field line merging, the deinterlacing in accordance with the present invention adaptively uses a portion of each method depending on how much motion is detected at the pixel. The mechanism for estimating motion in accordance with the present invention is not as sophisticated as the conventional complex motion compensation methods. However, the mechanism for estimating motion compensation in accordance with the present invention provides suitable motion estimation for many video applications. In addition, the deinterlacing algorithm in accordance with the present invention does not require the extensive processing and memory resources that the complex motion compensation methods require. Therefore, the deinterlacing of the present invention is ideally suited for video applications in which processing and memory resources are limited.

In a second embodiment of the invention, three consecutive input fields of interlaced video are converted into two output fields of interlaced video. The second temporal input field is replicated to produce a first of the two output fields. The other field is generated on a per pixel basis.

Specifically, for a given output pixel corresponding to an output position of the second output field, at least one pixel of the second temporal input field that is vertically adjacent to the output position of the second output field is used to determine which of the first temporal input field and third temporal input field more closely correlates to the second temporal input field at the output position. In one specific case, the upper pixel of the second temporal field (the upper pixel being directly above the output position of the second output field) is accessed. In addition, the lower pixel of the second temporal field (the lower pixel being directly below the output position of the second output field) is accessed. The upper pixel and the lower pixel are then averaged. This averaged value is then used to compare to the value of the corresponding pixel in the first temporal input field and to the value of the corresponding pixel in the third temporal field.

Then, a value is assigned to the output pixel that is based on the correlation at the output position between the first temporal input field and the second temporal input field, and between the third temporal input field and the second temporal input field. In a specific example, the value leans toward the value of the pixel in whichever of the first temporal input field or third temporal input field is closer at the output position to the averaged value.

In one example, a blending factor is used to determine how much of the value of the pixel in the first temporal input field at the output position, and how much of the value of the pixel in the third temporal input field at the output position is weighed in assigning the value to the output pixel. If, for a given pixel, the averaged value is closer to the value of the pixel in the first temporal input field at the output position, then the value of the blending factor is altered in one direction. If, on the other hand, the averaged value is closer to the value of the pixel in the third temporal input field at the output position, then the value of the blending factor is altered in the opposite direction. The altered blending factor is carried forward for the analysis of other pixels. Thus, the blending factor changes as pixels in a given line are generated. The blending factor may be reset to a neutral value as each line begins.

The second embodiment takes into consideration which of the first and third temporal input fields are closer to the second temporal input field when determining how much of the first temporal input field and how much of the third temporal input field should be used in generating the second temporal input field. Thus, if there is a big difference between the second and third temporal input fields, the first output field will be the second temporal input field while the second output field will tend more towards the first temporal input field. Likewise, if there is a big difference between the first and second temporal input fields, the first output field will be the second temporal input field while the second output field will tend more towards the third temporal input field. This is especially useful with performing inverse telecine.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4D illustrates the progressive frame of FIG. 4B with the value of the subject pixel filled in;

DETAILED DESCRIPTION OF THE INVENTION

The present invention extends to the adaptive deinterlacing of interlaced video to generate a progressive frame on a per pixel basis. In a first embodiment, two consecutive fields of interlaced video are converted into a frame of progressive video. One of the fields is replicated to generate half the lines in the progressive frame. Each of the pixels in the other half of the progressive frame are generated pixel-by-pixel. Specifically, for a given output position of the pixel in the other half of the progressive frame, a correlation is estimated between the corresponding pixel in the non-replicated field and at least one vertically adjacent pixel of the replicated field, and optionally one or more vertically adjacent pixels in the non-replicated fields. A value is then assigned to the output pixel that corresponds to the output position, the value depending on the correlation. If there is a high vertical correlation, then more field merging is performed for that pixel since a high correlation suggests less likelihood movement at that pixel position. If there is a low vertical correlation, then more scan line interpolation is performed for that pixel since a low correlation suggests more likelihood of movement at that pixel position.

The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Figure 1:
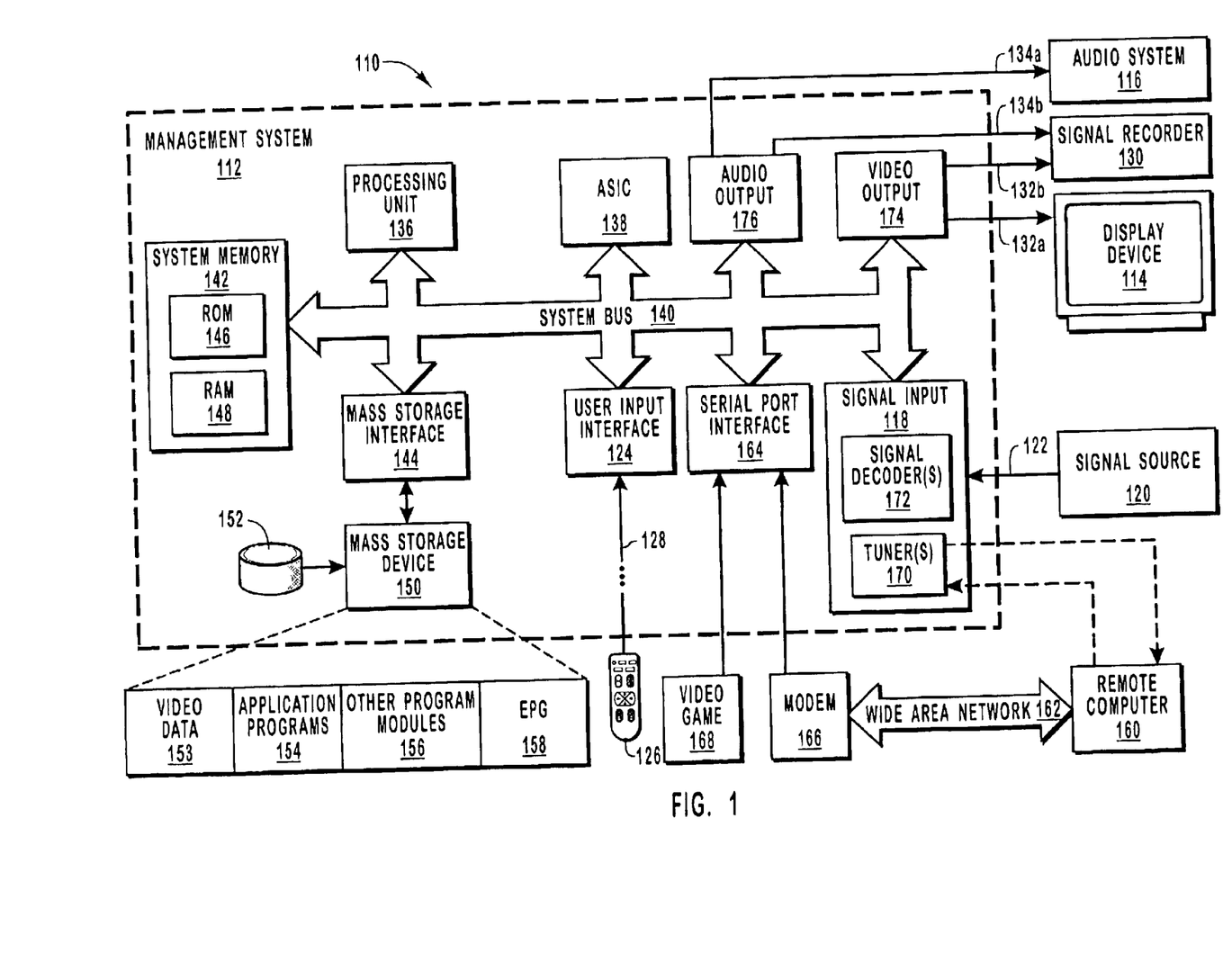
FIG. 1 illustrates an exemplary system that provides a suitable operating environment for the present invention.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing acts and steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable and non-viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal may use standard telephone lines, Integrated Services Digital Network (ISDN) lines, cable lines associated with cable television service, or the like to connect to the Internet or other wide area networks.

FIG. 1 illustrates a home entertainment system 110 that includes a management system 112, a display device 114 and an audio system 116. Management system 112 may be a set-top box or Internet terminal that has been adapted to perform the operations disclosed herein. Management system 112 may be integrally positioned with or separate from display device 114, which may be a high definition television display, a standard television display, a flat panel display, a projection device, an interface involving direct neural stimulation, a computer monitor, or any other device capable of displaying viewable video image data. Audio system 116 may be a speaker, a stereo system, or any device capable of emitting sound data, and similarly may be integrally positioned with or separate from display device 114.

Management system 112 includes a signal input 118, which receives programming from a signal source 120. The programming is transmitted from signal source 120 to signal input 118 via a programming input line 122, which can be a cable or optic connection, a terrestrial antenna system, a satellite system, or any device or system capable of transmitting programming to home management system 112.

The signal source 120 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/ DVB, a cable box, locally broadcast programming (i.e. programming broadcast using UHF or VHF), and the like.

FIG. 1 illustrates home entertainment system 110 as having a single programming input line 122 and a single signal source 120, there may also be a plurality of programming input lines that transmit programming from a plurality of signal sources. In such embodiments, the home entertainment system may receive the programming from one signal source or from a plurality of signal sources at a time.

Management system 112 also includes a user input interface 124, which receives input from an input device 126, such as a remote control, external special purpose or general-purpose processing device or computer, keyboard, microphone, mouse, or any other device capable of generating electronic instructions for management system 112. Input device 126 is communicatively coupled to management system 112 over an input link 128 so as to enable such control. Input device 126 generates electronic instructions over input link 128 in response to preprogrammed data or in response to a viewer pressing buttons on input device 126. Input device 126 may also control Web browser software within management system 112 as when management system 112 is a set-top box or an Internet terminal that has been adapted to perform the operations disclosed herein. For instance, input device 126 may be programmed to turn on home entertainment system 110 and to tune management system 112 to a channel.

FIG. 1 illustrates a signal recorder 130, which is capable of receiving video and/or audio data and recording the data on a storage medium. Video signals are transmitted to display device 114 and/or signal recorder 130 by video image links 132*a* and 132*b* respectively, examples of which include a radio-frequency ("RF") link, an S-video link, a composite link, or any other equivalent form of video image link. Similarly, audio links 134*a* and 134*b* transmit audio data from management system 112 to audio system 116 and/or to signal recorder 130.

The operation of management system 112 is controlled by a central processing unit ("CPU"), illustrated as processing unit 136, which is coupled to an application-specific integrated circuit ("ASIC") 138 via system bus 140 and uses computer-executable instructions implemented in software and/or hardwired logic circuitry. Processing unit 136 and ASIC 138 are also coupled via a system bus 140 to various other system components, including system memory 142, mass storage interface 144, user interface 124 and signal input 118. Processing unit 136 may execute software designed to implement features of management system 112 including features of the present invention. Alternatively or in addition, ASIC 138 may be used to implement the features of the present invention.

ASIC 138 contains circuitry that is used to implement certain functions of management system 112. Instructions, data, and other program modules necessary for the operation of processing unit 136 and necessary for the operation of the ASIC 138 may be stored in mass storage device 150 and/or system memory 142, which includes read-only memory ("ROM") 146 and random-access memory ("RAM") 148. System memory 142 is coupled to system bus 140 and mass storage device 150 is coupled to mass storage interface 144, which is in turn also coupled to system bus 140. Thus, ROM 146, RAM 148 and mass storage device 150 are communicatively coupled to ASIC 138 so as to be readable by ASIC 138 and so that data may be written from ASIC 138 to RAM 148 and to mass storage device 150. Mass storage device 150 may be a magnetic hard disk 152, but may also be any of the other computer-readable media referenced above.

Any desired computer-readable instructions or data, including application programs 154, other program modules 156, and an electronic programming guide ("EPG") 158, which specifies the broadcast times and channels of programs can be stored in mass storage device 150.

Mass storage device 150 may also be used to record video data 153, in which case, management system 112 performs the functions of a digital video recorder. Digital video data may be received by home entertainment system 110 from a variety of sources including signal source 120, remote computer 160, video game 168, input device 126 and the Internet.

EPG data may be obtained in a variety of manners. For instance, the EPG data can be supplied to management system 112 by a remote computer 160, such as a server, or from devices on the Internet and stored on mass storage device 150. The EPG data may be supplied on a regular basis to continually maintain a current schedule of programming at the management system 112. Alternatively, the EPG may be delivered to home entertainment system 110 by using a direct-dial communication over standard telephone lines, or by using data transmission over the cable television infrastructure, a satellite network, an over-the-air broadcast or any other available medium, including those previously mentioned.

In the embodiment where management system 112 is associated with the Internet, management system 112 may communicate with remote computer 160 via wide area network ("WAN") 162 using a variety of techniques, including interposing serial port interface 164 between the system bus 140 and a modem 166, using a wireless link, or other means for establishing communications over a WAN that may be internal or external to management system 112. Management device 112 is also capable of transmitting information via the Internet by direct-dial communication over standard telephone lines, or by using any other available communication medium.

While serial port interface 164 may be utilized to connect a modem 166 for communicating across a WAN, serial port interface may also be utilized to connect other consumer electronic devices, such as video game 168, and/or various input devices, such as a keyboard (not shown) or joystick (not shown), to management device 112.

Referring now to signal input 118, if the signal on programming input line 122 includes multiple channels, a tuner 170 included in signal input 118 tunes to a selected channel in the signal. Multiple tuners 170 can be used to provide enhanced viewing features, such as picture-in-picture, recording one channel while viewing another, and recording a plurality of channels simultaneously. A signal decoder 172 may convert video data from an analog format to a digital format, from a digital format to an analog format, or convent between varying digital formats, in the event that ASIC 138 and tuner 170 employ different formats. Video decoder 172 may also decode video data from a compressed video format (e.g. MPEG). Alternatively or in addition, the ASIC 138 may be used to decode video. In embodiments where the management system 112 includes multiple tuners 170, management system 112 may also include multiple signal decoders 172 to perform the operations disclosed herein.

Management system 112 may also include video output 174, which may include a video converter that switches between analog and digital formats as necessary when providing video data over video links 132a and 132b. Similarly, audio output 176 can include an audio converter to provide the necessary switching between analog and digital formats across audio links 134a and 134b.

While FIG. 1 and the corresponding discussion above provide a general description of a suitable environment in which the invention may be implemented, it will be appreciated that the features of the present invention disclosed herein may be practiced in association with a variety of different system configurations. The invention may be implemented in software, hardware or any combination thereof, whether now existing or to be developed in the future, that is able to implement the principles of the present invention. Examples of suitable operating environments that may be adapted to implement the principles of the present invention include general purpose computers, special purpose computers, set top boxes, or the like.

Figure 2:
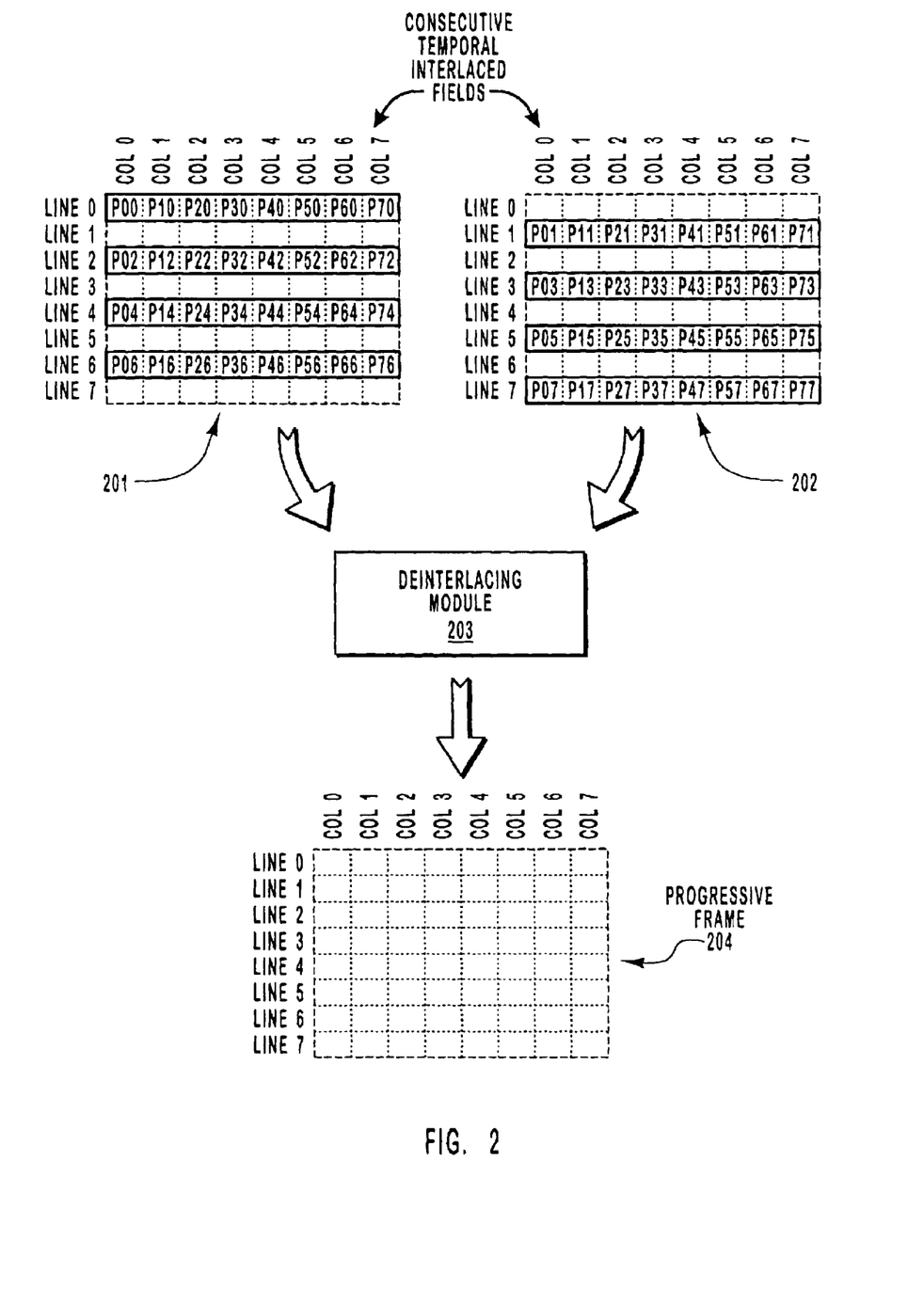
FIG. 2 schematically illustrates the conversion of two consecutive interlaced fields into a single progressive frame using a deinterlacing module in accordance with a first embodiment of the present invention.

FIG. 2 illustrates a deinterlacing module 203 that converts two temporal interlaced fields 201 and 202 into a progressive frame 204. The deinterlacing module 203 may be, for example, one of the application programs 154 and/or other program modules 156 which may be loaded into system memory 142 in preparation for execution by processing unit 136. Alternatively, or in addition, the deinterlacing module 203 may be hard-wired in the ASIC 138. In addition, the video data described herein may be received from any of the video sources described above with respect to FIG. 1 and may be stored in system memory 142.

An interlaced field of video includes half of the number of total lines in an image. A sequence of interlaced fields arranged in display order alternate, field-by-field, between an even parity field and an odd parity field. Even parity fields are those fields that include only the even numbered lines in the image. Odd parity fields are those fields that include only the odd numbered lines in the image. For example, the interlaced field 201 is an even parity field since it includes only lines 0, 2, 4 and 6. The interlaced field 202 is an odd parity field since it includes only lines 1, 3, 5 and 7.

In the example of FIG. 2 and subsequent figures, interlaced fields are shown as being relatively small for clarity. For example, the interlaced fields are illustrated as being composed of 4 lines of 8 pixels, while the progressive frames are illustrated as being composed of 8 lines of 8 pixels. However, a typical interlaced field and progressive frame will be many times larger than the example interlaced fields and progressive frames used in the figures and in this description. The smaller example fields and frames are used herein for clarity in describing the key principles of the present invention. The present invention is not limited to any particular size of interlaced field or progressive frame.

In FIG. 2 and in subsequent figures, pixel values are identified by the position of the corresponding pixel in the field or frame. For example, Pxy is used to identify a pixel value corresponding to the pixel that is in the x'th column of the y'th line. In FIG. 2, the progressive frame 204 initially contains no pixel values. The deinterlacing module 203 fills the progressive frame 204 with pixel values as is now described.

A pixel typically has several associated component values. For example, in the YCbCr color space, a pixel has a Y or "luma" component that specifies the luminance of the pixel. A pixel may also have Cb and Cr "chroma" components that together specify the color of the pixel. However, the deinterlacing method described herein might be implemented only on the luma component, although several alternatives are also described further below. Since the human eye is less sensitive to color variations than brightness variations, the chroma components for the progressive frame may be obtained by pure scan line interpolation. Again, several alternatives to using just the luma component are described further below.

Figure 3:
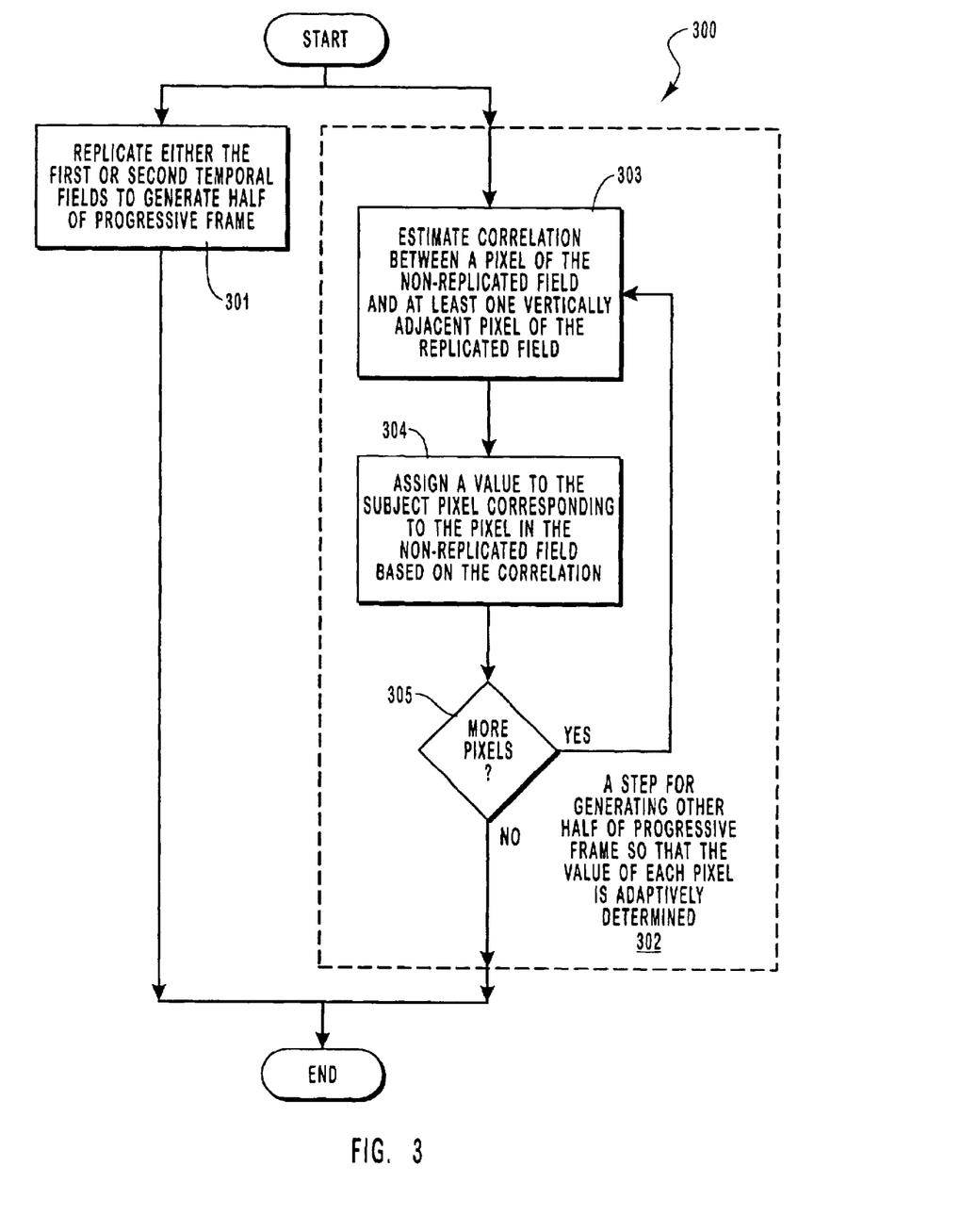
FIG. 3 illustrates a flowchart of a method for converting two consecutive interlaced fields into a single progressive frame in accordance with the first embodiment of the present invention.
Figure 4A:
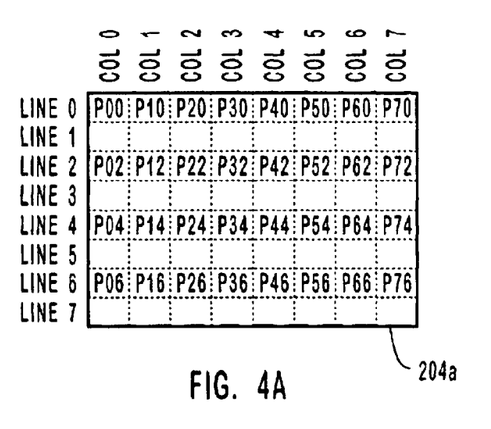
FIG. 4A illustrates a progressive frame with half of its values assigned by replicating one of the two consecutive interlaced fields.

FIG. 3 illustrates a flowchart of a method 300 of converting consecutive temporal fields of interlaced video (e.g., fields 201 and 202) into a progressive frame of video. Half of the progressive frame is generated by simply replicating either of the consecutive fields of interlaced video (act 301). FIG. 4A illustrates the state 204a of the progressive frame 204 after the field 201 has been replicated into the progressive frame.

The method also includes a step for generating the other half of the progressive frame so that the value of each pixel is adaptively determined on a per pixel basis depending on the vertical correlation in the first and second temporal fields at the position of the pixel (step 302). This step may include, for example, corresponding act 303, corresponding act 304, and decision block 305.

Figure 4B:
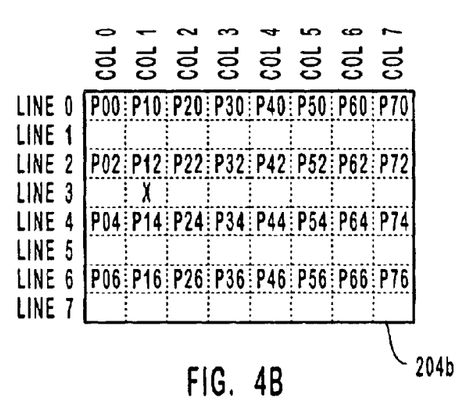
FIG. 4B illustrates the progressive frame of FIG. 4A with a pixel location marked with an "X" to identify a subject pixel that is to be assigned a value.

The other half of the progressive frame is generated on a per pixel basis. FIG. 4B shows the state 204b of the progressive frame 204 after one of the interlaced fields has been replicated. Suppose that the method is now to determine the value of the pixel corresponding to column 1, line 3 of the progressive frame. This location is marked with an "X" in FIG. 4B for clarity.

Using this output position as an example, the method then estimates a correlation between a pixel of the non-replicated temporal field and at least one vertically adjacent pixel of the replicated temporal field (act 303). In the example, the non-replicated temporal field is field 202. The pixel of the non-replicated temporal field is pixel P13 since this pixel corresponds to the output position marked with an "X". In the example, the replicated field is field 201. The vertically adjacent pixels of the replicated temporal field include pixels P12 and P14.

Figure 4C:
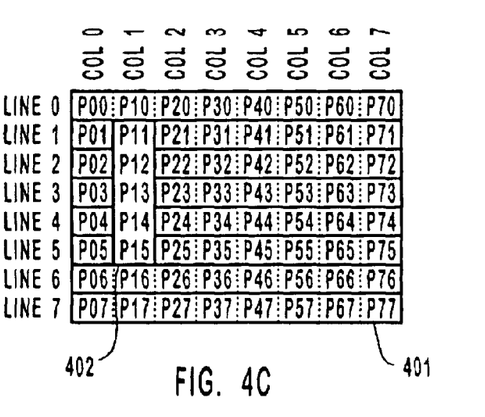
FIG. 4C illustrates both of the two consecutive interlaced fields superimposed with a correlation window that identifies a column of five pixels that are to be analyzed for correlation.
Figure 4D:
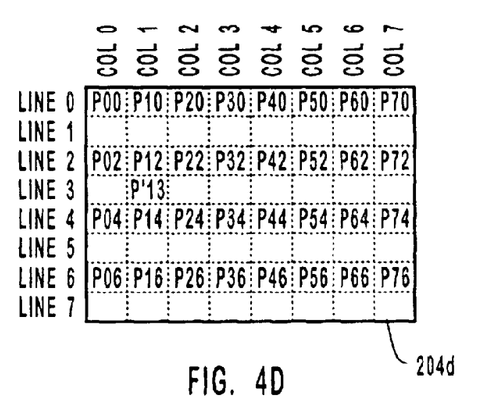

For example, referring to FIG. 4C, fields 201 and 202 are shown superimposed. A vertical correlation window 402 conceptually covers the pixel of the non-replicated temporal field (e.g., pixel P13) as well as both vertically adjacent pixels of the replicated field (i.e., pixels P12 and P14). In addition, the vertical correlation window 402 in the example of FIG. 4D also includes other vertically aligned pixels from the non-replicated field 202 (e.g., pixels P11 and P15).

The correlation between each of the pixels in the vertical window is estimated. The correlation is based on whether vertically adjacent pixels (more specifically, the pixel values) are equal to, greater than, or less then an adjacent pixel. There are five pixels in the window, namely, in this example, pixels P11, P12, P13, P14 and P15. P11 is compared to P12; P12 is compared to P13; P13 is compared to P14; and P14 is compared to P15. For each of these four comparisons, is then determined which of the following three conditions applies:

Condition 1: The upper pixel is greater than the adjacent lower pixel by more than a given tolerance (condition 1 is represented by the symbol ">");

Condition 2: The value of the upper pixel is within the given tolerance of the value of the vertically adjacent lower pixel (condition 2 is represented by the symbol "="); and Condition 3: The upper pixel is less than the adjacent lower pixel by more than the given tolerance (condition 3 is represented by the symbol "<").

Since there are four total comparisons in a five pixel window, with three possible results for each comparison, there are 81 different comparison results. These 81 different possibilities are reduced to 16 by only recognizing that adjacent pixels to be greater than or less than vertically adjacent pixels.

In order to accomplish this reduction in comparison permutations, the three upper pixels (in this case, pixels P11, P12 and P13) are compared. The relative values of these three pixels will be represented by a series of two consecutive characters, each character may be ">", "<" or "=". The first character represents the comparison between the lower two pixels (in this case, pixels P12 and P13) in the three pixels. The second character represents the comparison between the upper two pixels (in this case, pixels P11 and P12) in the three pixels. For example, a "><" indicates that the middle pixel (in this case, pixel P12) in the three pixels is greater than the lowest pixel (in this case, pixel P13), and that the upper pixel (in this case, pixel P11) is less than the middle pixel (in this case, pixel P12).

There are nine different comparison outcomes for the upper three pixels in the pixel window since there are a total of two comparisons with three possible outcomes each. However, if the "=" outcome is eliminated, in other words, if the each comparison is forced to be either ">" or "<", then there are only four different comparison outcomes. This reduction is accomplished in accordance with the following Table 1.

TABLE 1

| Input Comparisons | Intermediate Assignment | Output Comparisons |
|---|---|---|
| <> | > alt | <> |
| >< | < alt | >< |
| >>, >=, and => | > no alt | >> |
| <<, =<, and <= | < no alt | << |
| == | ≈ | either << or >> |

Note that input comparison "==" is either converted to an output comparison of either "<<" or ">>". In this case, the output comparison is assigned to be the comparison that maximizes correlation (minimizes alpha) as defined by the correlation values of Table 2. More regarding this will be explained further below with respect to Table 2. In this manner, the nine possible input comparisons for the upper three pixels are reduced to four possible output comparisons where there are no "=" comparisons. This is repeated for the lower three pixels (in this case pixels P13, P14 and P15) in the window 402. Thus, there are a total of sixteen comparisons involving four comparisons with two possible relationships ">" or "<" for each comparison. The sixteen possible comparisons are thus, "<<<<", "<<<>", "<<><", "<<>>", "<><<", "<><>", "<>><", "<>>>", "><<<", "><<>", "><><", "><>>", ">><<", ">><>", ">>><", and ">>>>".

Based on the four comparisons, the output position is then assigned a correlation value "alpha" that ranges from 0 to 1. Higher alpha values estimate less correlation with an alpha value of 1 estimating no correlation with the vertically surrounding pixels. Lower alpha values estimate more correlation with an alpha value of 0 estimating perfect correlation with the vertically surrounding pixels.

The four comparisons include two possible values "<" or ">" and are listed starting from the bottom to the top. For example, "><>>" indicates that the next to the bottom pixel P14 is greater than the bottom pixel P15, the middle pixel P13 is less than the next to the bottom pixel P14, the next to the top pixel P12 is greater than the middle pixel P13, and top pixel P11 is greater than the next to the top pixel P12. The middle pixel P13 is assigned a correlation value "alpha" based on its relationship with the other pixels in accordance with the following Table 2.

TABLE 2

| Input Vertical Comparisons | "Alpha" Value |
|---|---|
| >>>>, <<<< | 0 |
| ><><, <><> | 1 |
| >>><, >><<, ><<<, <<<>, <<>>, <>>> | 1/8 |
| <>><, ><<>, >><>, ><>>, <><<, <<>< | 3/4 |

As mentioned above, if the input comparisons between pixels P11, P12 and P13 was "==" in Table 1. The output comparisons would be assigned either ">>" or "<<" depending on what would minimize alpha according to Table 2 given the output comparisons between pixels P13, P14 and P15. For example, suppose that the input comparisons for P11, P12 and P13 was "==", but that the output comparisons for P13, P14 and P15 was ">>".

The possible choices for the input vertical comparisons ">>??" (where "??" represents a place marker for the vertical comparisons between P11, P12, and P13) are ">><<" (alpha=1/8), ">><>" (alpha=3/4), ">>><" (alpha=1/8), and ">>>>" (alpha=0). In order to minimize alpha (and maximize correlation), if the output comparisons from Table 1 between P13, P14, P15 were ">>", then the output comparisons for P13, P14, P15 would be selected to be ">>" as well thus resulting in an alpha value of zero.

It turns out that in order to minimize alpha when the input comparisons are "==", the output comparisons are either ">>" or "<<". For example, if the input comparisons for pixels P11, P12, and P13 are "==" and the output comparisons for the pixels P13, P14, and P15 are either ">>" or "><", then the output comparisons for pixels P11, P12, and P13 would be chosen to be ">>". If the input comparisons for the pixels P11, P12, and P13 are "==" and the output comparisons for the pixels P13, P14 and P15 are either "<<" or "<>", then the output comparisons for the pixels P11, P12, and P13 would be chosen to be "<<". If the input comparisons for pixels P11, P12, and P13 are "==" and the input comparisons for pixels P13, P14, and P15 are also "==", then the input vertical comparisons in Table 2 may be chosen to be either ">>>>" or "<<<<".

The subject pixel that corresponds to the output position (i.e., corresponds to the position of pixel P13) in the progressive frame is then assigned a value corresponding to the following equation 1.

$$p'(0) = \text{alpha} * 0.5 * (p(1) + p(-1)) + (1 - \text{alpha}) * p(0) \quad (1)$$

where, p'(0) is the value of the subject pixel;

alpha is the correlation value derived from Table 2;

p(1) is the value of the vertically adjacent lower pixel from the replicated field;

p(0) is the value of the pixel in the non-replicated field that corresponds to the output position; and p(−1) is the value of the vertically adjacent upper pixel from the replicated field.

When the five pixels in the vertical window correlate perfectly (i.e., "alpha" equals zero), no motion corresponding to the subject pixel is suggested. Accordingly, equation 1 reduces to equation 2 as follows.

$$p'(0)=p(0) \qquad (2)$$

In other words, if there is perfect correlation, the pixel from the non-replicated field is assigned as the value of the subject pixel in the progressive frame. Thus, for that one pixel position, field merging is perform as the vertical correlation suggested no motion between the consecutive temporal interlaced field at that output position.

When the five pixels in the vertical window correlated poorly (i.e., "alpha" equals one), then motion is suggested between the consecutive fields at the output position. Accordingly, equation 1 reduces to the following equation 3.

$$p'(0)=0.5*(p(1)+p(-1)) \qquad (3)$$

In this case, pure scan line interpolation is used for that pixel. In other words, the upper vertically adjacent pixel from the replicated field is averaged with the lower vertically adjacent pixel from the replicated field to generated the output pixel.

For alpha values between zero and one, equation 1 may be used to interpolate between the field merging of equation 2 and the scan line interpolation of equation 3.

As was noted above, in the YCbCr color space, a pixel has several component values including a "Y" or "luma" component that represents the brightness of the pixel, as well as several color or "chroma" component values Cb and Cr which, combined, define the color of the pixel. If the Cb and Cr components were zero, a grayscale brightness could be set using just the Y component. In the YCbCr color space, the Cb and Cr components can be subsampled with respect to the Y component since the eye is less sensitive to chroma than luma. For instance, if an image is 640×480, the map of Y components would be 640×480, while the maps of Cb and Cr components could each be 640×480 (known as 4:4:4), 320×480 (4:2:2), or 320×240 (4:2:0). For the 4:2:0 and 4:2:2 formats, chroma would be interpolated before it is displayed.

In performing deinterlacing in accordance with the first embodiment of the present invention described above, the deinterlacing method is performed just on the luma component. Hence, the term "pixel value" is often used above to describe the pixel's luma component. The Cb and Cr components can be produced by using other, less computationally intensive deinterlacing methods, such as performing scan-line interpolation from whichever field was used as the replicated field in producing the deinterlaced Y component. Field merging may also be used to produce the Cb and Cr components although field merging tends to produce more artifacts than scan-line interpolation when producing Cb and Cr components.

By performing adaptive deinterlacing only on the luma component of the pixel, the processing requirements of the deinterlacing method are lower that they would be if adaptive deinterlacing were to be performing on all pixel component values. In addition, performing scan-line interpolation on Cb and Cr does not generate very objectionable artifacts, since the eye is not as sensitive to these chroma component values. However, the present invention may also be used to perform adaptive deinterlacing on all of the pixel component values if desired by repeating the described methods for each of the Y, Cb and Cr component values.

Alternatively, the correlation values resulting from the correlation test on the Y component values may be used to adaptively interpolate between scan line interpolation and field merging for that pixel for the Cb and Cr components as well. In addition to the YCbCr color space, the method may also be performed in other color spaces (for example, the RGB color space) as well by either processing each component independently or by using one component's correlation test to adaptively interpolate between scan line interpolation and field merging for the other component values for that pixel.

In the first embodiment of the present invention described above, two consecutive interlaced fields are converted into a single progressive frame. In the second embodiment of the present invention which will now be described, three consecutive interlaced fields are converted into two interlaced fields. Those two output interlaced fields may then be provided as inputs to the first embodiment of the present invention for conversion into a progressive frame if so desired.

Figure 5:
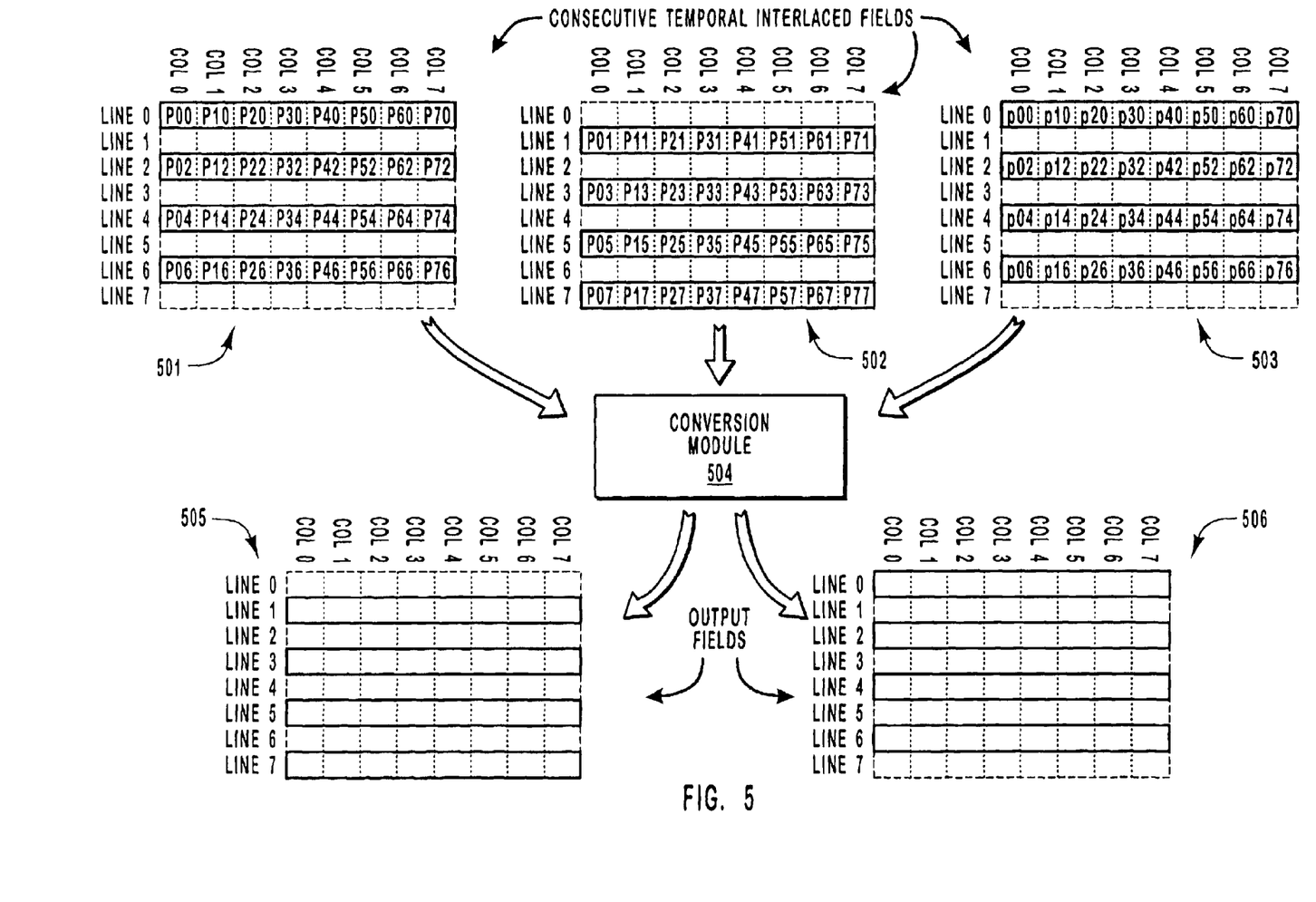
FIG. 5 schematically illustrates the conversion of three consecutive interlaced fields into two interlaced fields using a conversion module in accordance with a second embodiment of the present invention.

Referring to FIG. 5, three consecutive interlaced fields 501, 502 and 503 are converted into two interlaced fields 505 and 506 using a conversion module 504. In this illustrated example of FIG. 5, the second temporal interlaced field 502 has an odd parity (i.e., it contains only odd numbered lines), while the first and third temporal interlaced fields 501 and 503 are even parity (i.e., they contain only even lines). Alternatively, the second temporal interlaced field 502 could have an even parity, while the first and third temporal fields 501 and 503 have an odd parity. Either way, the principles of the second embodiment apply as described herein. The two output fields are of opposite parity with output field 505 having an odd parity while output field 506 has an even parity.

Figure 6:
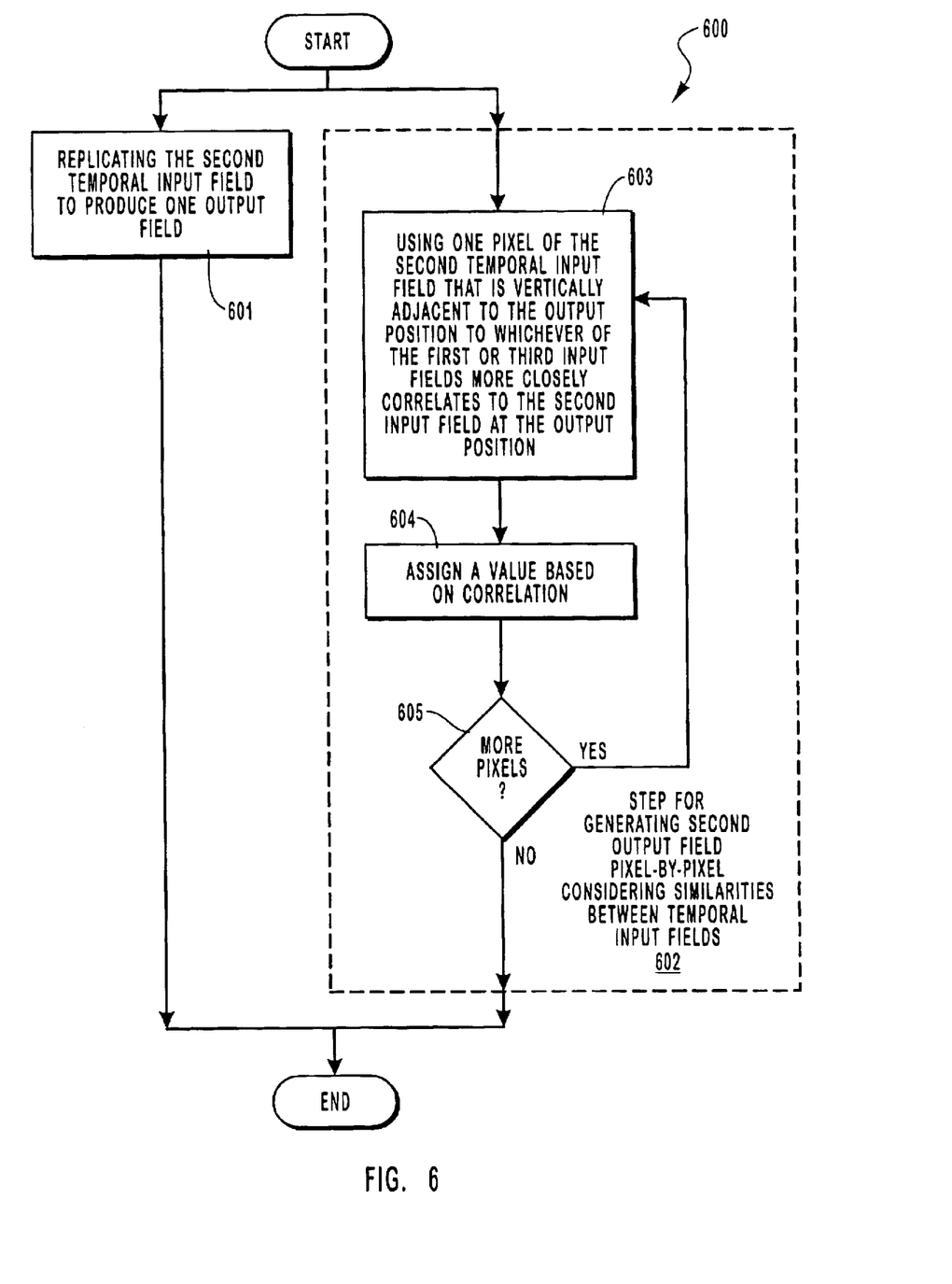
FIG. 6 illustrates a flowchart of a method for converting three consecutive interlaced fields into two interlaced fields in accordance with the second embodiment of the present invention.

FIG. 6 illustrates a flowchart of a method 600 for converting three consecutive interlaced fields into two interlaced fields in accordance with the second embodiment of the present invention. In accordance with the method, the second temporal input field is replicated to produce one output field (act 601) that has the same parity as the second temporal input field. Since the second temporal input field has an odd parity, the second temporal input field is replicated into the output field 505. This is represented by output field 505a of FIG. 7A.

The method also includes a step for generating the second output field pixel-by-pixel considering similarities between temporal input fields (step 602). In the embodiment illustrated in FIG. 6, this step includes corresponding act 603, corresponding act 604, and decision block 605.

Figure 7A:
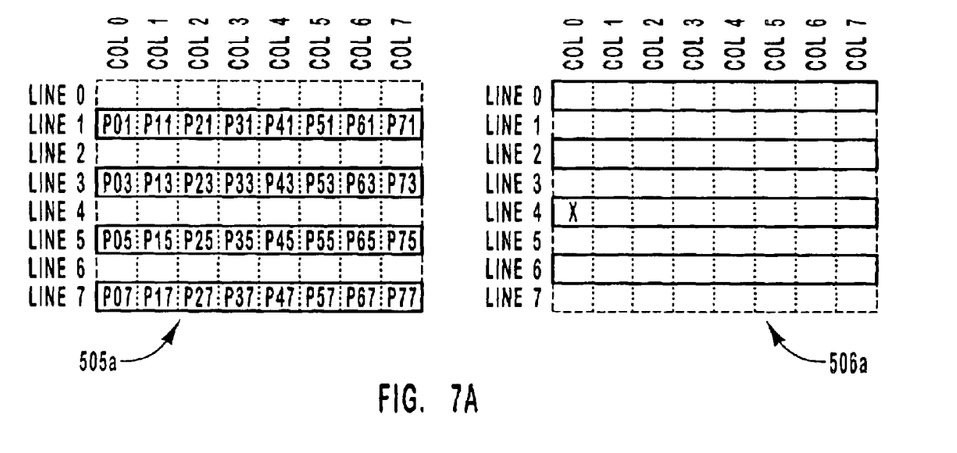
FIG. 7A illustrates one of the output fields with its values determined by replicating the second temporal input field and with a pixel position in the second output field marked by an "X" to identify a pixel that is to be assigned a value.

The second output field is generated pixel-by-pixel. FIG. 7A illustrates the second output field 506a with one of the pixel positions marked with an "X". For this output position, the method uses at least one pixel of the second temporal input field that is vertically adjacent to the output position of the second output field to determine which of the first temporal input field and third temporal input field more closely correlates to the second temporal input field at the output position (act 603). Referring to FIG. 5, the second temporal input field 502 contains two pixels (pixel P03 and pixel P05) that are vertically adjacent to the output position marked with an "X" in the output field 506a. Either one or both of these vertically adjacent pixels may then be used to determine which of the first or third temporal input fields more closely correlates to the second temporal input field at the output position.

In one example, both vertically adjacent pixels P03 and P05 are used. The values P03 and P05 are then interpolated, and then the interpolated value is used to estimate the correlation. In one example, the values P03 and P05 are averaged and the average value is used to estimate the correlation. The interpolated value is compared to the value of the pixel (e.g., pixel P04 in the example) in the first temporal input field that correlates to the output position (marked with an "X" in FIG. 7A), and is compared to the value of the pixel (e.g., pixel p04 in the example) in the third temporal input field that correlates to the output position.

Once the correlation is determined, a value is assigned to the pixel corresponding to the output position (act 604), the value depending upon the correlation. Specifically, the value of the pixel at the output position tends towards the value of P04 if the first temporal input field more closely correlates to the second temporal input field at the output position. Also, the value of the pixel at the output positions tends towards the value of p04 if the third temporal input field more closely correlates to the second input field at the output position.

In one example, a blending factor is used to appropriately value the pixel at the output position. This blending factor may be an integer value between 0 and 16 inclusive, but excluding 8 so that the value may be represented by four bits. A lower blending factor means more of the corresponding pixel value of the first temporal input field is used to assign the value to the output pixel in the second output field. A higher blending factor means more of the corresponding pixel value of the third temporal input field is used to assign the value to the output pixel in the second output field.

Figure 7B:
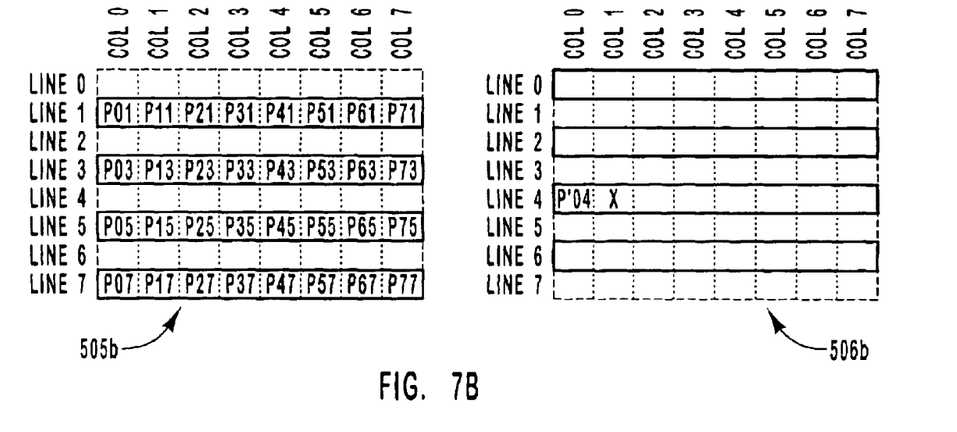
FIG. 7B illustrates the two output fields with the value of the pixel previously marked with an "X" filled in and with the next horizontal pixel in the line marked with an "X" to illustrate that that pixel is now to be assigned a value.

At the beginning of each line, the value is set to a relatively neutral value of, for example, 7 or 9. Then, a change in the blending factor is determined based on the correlation of the averaged value of the vertically adjacent pixels in the second temporal input field with the corresponding pixels in the first and third temporal input fields. If the averaged value correlates better to the corresponding pixel in the first temporal input field, then the blending factor is decreased. If the averaged value correlated better to the corresponding pixel in the third temporal input field, then the blending factor is increased. The pixel value is then assigned based on the current value of the blending factor. For example, in FIG. 7B, the value P'04 is assigned to the output position.

If there are more pixels in the second output field to be generated (YES in decision block 605), then act 603 and 604 are repeated for the next pixel (e.g., the pixel marked with an "X" in FIG. 7B) with the new blending factor carried forward. Specifically, in act 603, the pixel values P13 and P15 may be averaged. The averaged value is then compared to pixel values P14 and p14 to determine how much the new carried forward blending factor should change, if at all. The process is repeated for each pixel until all the pixels in the second output field have been generated (NO in decision block 605).

In this second embodiment, the pixel values that are subject to the above method may be the luma components of the pixel only. Alternatively, the above process may be repeated for each pixel component. In addition, the blending factor determined for one of the pixel components (e.g., the luma component) may be used in determining how to assign the other components (e.g., the chroma components) for the pixel.

One key advantage of the second embodiment of the present invention is that generation of the second output field takes into consideration which of the first and third temporal input fields more closely matches the second temporal input field. Thus, if there is a major change (e.g., a cut) between the second and third temporal input fields, the output fields will correspond closely to the first and second temporal input fields. On the other hand, if there is a major change between the first and second temporal input fields, the output field will correspond closely to the second and third temporal input fields. Thus, the two output fields will tend to have fewer differences and thus will lend themselves better to conversion into a single progressive frame. One application in which a major change may occur between successive interlaced fields is when one performs inverse telecine conversion. Thus, the second embodiment of the present invention is useful in performing inverse telecine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that has access to interlaced representation of video, a method of converting the interlaced representation of the video into a progressive representation of the video by converting a first temporal field and a subsequent second temporal field of interlaced video into a progressive frame, the method comprising the following:

an act of replicating one of the first temporal field or the second temporal field to generate half of the progressive frame;

an act of estimating a correlation between a pixel of the other non-replicated temporal field and at least one vertically adjacent pixel of the replicated temporal field; and an act of assigning a value to a subject pixel in the other half of the progressive frame, the subject pixel corresponding to the position of the pixel of the non-replicated temporal field, wherein the value is based on the correlation.

2. A method in accordance with claim 1, further comprising:

an act of repeating the act of estimating a correlation and the act of assigning a value for each of the remaining pixels in the non-replicated temporal field.

3. A method in accordance with claim 1, wherein the act of assigning a value to a subject pixel in the other half of the progressive frame comprises the following:

an act of assigning the value based on an interpolation between scan line interpolation and field merging depending on the correlation, wherein a higher correlation tends the value towards field merging and lower correlation tends the value towards scan line interpolation.

4. A method in accordance with claim 1, wherein the act of assigning the value based on an interpolation between scan line interpolation and field merging comprises the following:

an act of determining a correlation value between zero and one inclusive that represents the correlation between the pixel of the non-replicated temporal field and the at least one vertically adjacent pixel of the replicated temporal field, wherein the act of assigning a value based on an interpolation comprises the following:

an act of multiplying the correlation value by the value that would be obtained by pure field merging; and an act of multiplying one minus the correlation value by the value that would be obtained by pure scan line interpolation.

5. A method in accordance with claim 4, wherein the act of multiplying one minus the correlation value by the value that would be obtained by pure scan line interpolation comprises the following:

an act of determining the value that would be obtained by pure scan line interpolation.

6. A method in accordance with claim 5, wherein the act of determining the value that would be obtained by pure scan line interpolation comprises the following:

an act of averaging the value of the upper pixel in the replicated field that is immediately above the output position with the value of the lower pixel in the replicated field that is immediately below the output position.

7. A method in accordance with claim 1, wherein the act of estimating a correlation comprises the following:

an act of determining the correlation based on pixel values of field merged representations of the first and second temporal fields in a vertical column that includes the position of the subject pixel of the second temporal field.

8. A method in accordance with claim 7, wherein the vertical column is five pixels in height, two pixels being above the subject pixel, and two pixels being below the subject pixel.

9. A method in accordance with claim 7, wherein the vertical column in three pixels in height, one pixel being above the subject pixel, and one pixel being below the subject pixel.

10. In a computer system that has access to interlaced representation of video, a method of converting the interlaced representation of the video into a progressive representation of the video by converting a first temporal field and a subsequent second temporal field of interlaced video into a progressive frame, the method comprising the following:

an act of replicating one of the first temporal field or the second temporal field to generate half of the progressive frame; and a step for generating the other half of the progressive frame so that the value of each pixel is adaptively determined on a per pixel basis depending on the vertical correlation in the first and second temporal fields at the position of the pixel.

11. A method in accordance with claim 10, wherein the step for generating the other half of the progressive frame comprises the following:

an act of estimating a correlation between a pixel of the other non-replicated temporal field and at least one vertically adjacent pixel of the replicated temporal field; and an act of assigning a value to a subject pixel in the other half of the progressive frame, the subject pixel corresponding to the position of the pixel of the non-replicated temporal field, wherein the value is based on the correlation.

12. A computer program product for use in a computer system that has access to interlaced representation of video, the computer program product for implementing a method of converting the interlaced representation of the video into a progressive representation of the video by converting a first temporal field and a subsequent second temporal field of interlaced video into a progressive frame, the computer program product comprising a computer-readable medium having stored thereon computer-executable instructions which, when executed by one or more processors, cause the computer system to perform the following:

an act of replicating one of the first temporal field or the second temporal field to generate half of the progressive frame;

an act of estimating a correlation between a pixel of the other non-replicated temporal field and at least one vertically adjacent pixel of the replicated temporal field; and an act of assigning a value to a subject pixel in the other half of the progressive frame, the subject pixel corresponding to the position of the pixel of the non-replicated temporal field, wherein the value is based on the correlation.

13. A computer program product in accordance with claim 12, wherein the computer-readable medium is a physical storage medium.

14. A computer program product in accordance with claim 12, wherein the computer-readable medium further has stored thereon computer-executable instructions which, when executed by one or more processors, cause the computer system to performing the following:

an act of repeating the act of estimating a correlation and the act of assigning a value for each of the remaining pixels in the non-replicated temporal field.

15. A computer program product in accordance with claim 12, wherein the computer-executable instructions which, when executed by one or more processors, cause the computer system to perform the act of assigning a value to a subject pixel in the other half of the progressive frame comprise computer-executable instructions which, when executed by one or more processors, cause the computer system to perform the following:

an act of assigning the value based on an interpolation between scan line interpolation and field merging depending on the correlation, wherein a higher correlation tends the value towards field merging and lower correlation tends the value towards scan line interpolation.

16. A computer program product in accordance with claim 12, wherein the computer-executable instructions which, when executed by one or more processors, cause the computer system to perform the act of assigning the value based on an interpolation between scan line interpolation and field merging comprises computer-executable instructions which, when executed by one or more processors, cause the computer system to perform the following:

an act of determining a correlation value that represents the correlation between the pixel of the non-replicated temporal field and the at least one vertically adjacent pixel of the replicated temporal field, wherein the act of assigning a value based on an interpolation comprises the following:

an act of multiplying the correlation value by the value that would be obtained by pure field merging; and an act of multiplying one minus the correlation value by the value that would be obtained by pure scan line interpolation.

17. A computer program product in accordance with claim 16, wherein the computer-executable instructions which, when executed by one or more processors, cause the computer system to perform the act of multiplying one minus the correlation value by the value that would be obtained by pure scan line interpolation comprise computer-executable instructions which, when executed by one or more processors, cause the computer system to perform the following:

an act of determining the value that would be obtained by pure scan line interpolation.

18. A computer program product in accordance with claim 17, wherein the computer-executable instructions which, when executed by one or more processors, cause the computer system to perform the act of determining the value that would be obtained by pure scan line interpolation comprise computer-executable instructions which, when executed by one or more processors, cause the computer system to perform the following:

an act of averaging the value of the upper pixel in the replicated field that is immediately above the output position with the value of the lower pixel in the replicated field that is immediately below the output position.

19. A computer program product in accordance with claim 12, wherein the computer-executable instructions which, when executed by one or more processors, cause the computer system to perform the act of estimating a correlation comprise computer-executable instructions which, when executed by one or more processors, cause the computer system to perform the following:

an act of determining the correlation based on pixel values of field merged representations of the first and second temporal fields in a vertical column that includes the position of the subject pixel of the second temporal field.

20. In a computer system that has access to interlaced fields of video, a method of converting three temporally adjacent input fields of interlaced video into two output fields of interlaced video, the method comprising the following:

an act of replicating the second temporal input field to reproduce a first of the output fields;

for a given output pixel corresponding to an output position of the second output field, an act of using at least one pixel of the second temporal input field that is vertically adjacent to the output position of the second output field to determine which of the first temporal input field and third temporal input field more closely correlates to the second temporal input field at the output position; and an act of assigning a value to the output pixel based on the correlation between the first temporal input field and the second temporal input field, and between the third temporal input field and the second temporal input field corresponding to the output position.

21. A method in accordance with claim 20, wherein the act of using at least one pixel of the second temporal input field that is vertically adjacent to the output position of the second output field to determine which of the first temporal input field and third temporal input field more closely correlates to the second temporal input field at the output position comprises the following:

an act of accessing an upper pixel of the second temporal input field which is directly above the output position of the second output field;

an act of accessing a lower pixel of the second temporal input field that is directly below the output position of the second output field;

an act of interpolating a value based on the values of the upper pixel and the lower pixel; and an act of using the interpolated value to determine which of the first temporal input field and the third temporal input field more closely correlates to the second temporal input field at the output position.

22. A method in accordance with claim 21, wherein the act of interpolating a value based on the values of the upper pixel and the lower pixel comprises the following:

an act of averaging the value of the upper pixel with the value of the lower pixel to generated the interpolated value.

23. A method in accordance with claim 21, wherein the act of using the interpolated value to determine which of the first temporal input field and the third temporal input field more closely correlates to the second temporal input field comprises the following:

an act of comparing the interpolated value to the value of the pixel in the first temporal input field that correlates to the output position; and an act of comparing the interpolated value to the value of the pixel in the third temporal input field that correlates to the output position.

24. A method in accordance with claim 21, wherein the act of assigning a value to the output pixel based on the correlation between the first temporal input field and the second temporal input field, and between the third temporal input field and the second temporal input field corresponding to the output position comprises the following:

an act of tending the value of the output pixel more towards the value of the pixel in whichever of the first temporal input field or third temporal input field at the output position is closer to the interpolated value.

25. A method in accordance with claim 24, wherein the act of tending the value of the output pixel comprises the following:

an act of keeping track of a blending factor that is used to determine how much of the value of the pixel in the first temporal input field at the output position, and how much of the value of the pixel in the third temporal input field at the output position is weighed in assigning the value to the output pixel.

26. A method in accordance with claim 25, further comprising the following:

an act of changing the value of the blending factor in one direction if the interpolated value is closer to the value of the pixel in the first temporal input field at the output position;

an act of changing the value of the blending factor in the opposite direction if the interpolated value is closer to the value of the pixel in the third temporal input field at the output position; and an act of using the changed blending factor when analyzing the next horizontally adjacent output pixel.

27. A computer program product for use in a computer system that has access to interlaced fields of video, the computer program product for implementing a method of converting three temporally adjacent input fields of interlaced video into two output fields of interlaced video, the computer program product comprising a computer-readable medium having stored thereon computer-executable instructions which, when executed by one or more processors, cause the computer system to perform the following:

an act of replicating the second temporal input field to reproduce a first of the output fields;

for a given output pixel corresponding to an output position of the second output field, an act of using at least one pixel of the second temporal input field that is vertically adjacent to the output position of the second output field to determine which of the first temporal input field and third temporal input field more closely correlates to the second temporal input field at the output position; and an act of assigning a value to the output pixel based on the correlation between the first temporal input field and the second temporal input field, and between the third temporal input field and the second temporal input field corresponding to the output position.

28. A computer program product in accordance with claim 27, wherein the computer-executable instructions which, when executed by one or more processors, cause the computer system to perform the act of using at least one pixel of the second temporal input field that is vertically adjacent to the output position of the second output field to determine which of the first temporal input field and third temporal input field more closely correlates to the second temporal input field at the output position comprise computer-executable instructions which, when executed by one or more processors, cause the computer system to perform the following:

an act of accessing an upper pixel of the second temporal input field which is directly above the output position of the second output field;

an act of accessing a lower pixel of the second temporal input field which is directly below the output position of the second output field;

an act of interpolating a value based on the values of the upper pixel and the lower pixel; and an act of using the interpolated value to determine which of the first temporal input field and the third temporal input field more closely correlates to the second temporal input field at the output position.

29. A computer program product in accordance with claim 28, wherein the computer-executable instructions which, when executed by one or more processors, cause the computer system to perform the act of interpolating a value based on the values of the upper pixel and the lower pixel comprise computer-executable instructions which, when executed by one or more processors, cause the computer system to perform the following:

an act of averaging the value of the upper pixel with the value of the lower pixel to generated the interpolated value.

30. A computer program product in accordance with claim 28, wherein the computer-executable instructions which, when executed by one or more processors, cause the computer system to perform the act of using the interpolated value to determine which of the first temporal input field and the third temporal input field more closely correlates to the second temporal input field comprise computer-executable instructions which, when executed by one or more processors, cause the computer system to perform the following:

an act of comparing the interpolated value to the value of the pixel in the first temporal input field that correlates to the output position; and an act of comparing the interpolated value to the value of the pixel in the third temporal input field that correlates to the output position.

31. A computer program product in accordance with claim 28, wherein the computer-executable instructions which, when executed by one or more processors, cause the computer system to perform the act of assigning a value to the output pixel based on the correlation between the first temporal input field and the second temporal input field, and between the third temporal input field and the second temporal input field corresponding to the output position comprise computer-executable instructions which, when executed by one or more processors, cause the computer system to perform the following:

an act of tending the value of the output pixel more towards the value of the pixel in whichever of the first temporal input field or third temporal input field at the output position is closer to the interpolated value.

32. A computer program product in accordance with claim 31, wherein the computer-executable instructions which, when executed by one or more processors, cause the computer system to perform the act of tending the value of the output pixel comprise computer-executable instructions which, when executed by one or more processors, cause the computer system to perform the following:

an act of keeping track of a blending factor that is used to determine how much of the value of the pixel in the first temporal input field at the output position, and how much of the value of the pixel in the third temporal input field at the output position is weighed in assigning the value to the output pixel.

33. A computer program product in accordance with claim 32, wherein the computer-readable medium further has stored thereon computer-executable instructions which, when executed by one or more processors, cause the computer system to perform the following:

an act of changing the value of the blending factor in one direction if the interpolated value is closer to the value of the pixel in the first temporal input field at the output position;

an act of changing the value of the blending factor in the opposite direction if the interpolated value is closer to the value of the pixel in the third temporal input field at the output position; and an act of using the changed blending factor when analyzing the next horizontally adjacent output pixel.

34. The computer program product in accordance with claim 27, wherein the computer-readable medium is a physical storage medium.

35. In a computer system that has access to interlaced fields of video, a method of converting three temporally adjacent input fields of interlaced video into two output fields of interlaced video for improved processing of sudden difference video, the method comprising the following:

an act of replicating the second temporal input field to reproduce a first of the output fields; and a step for generating the second output field pixel-by-pixel considering similarities between the three temporally adjacent input fields.

36. In a computer system that has access to interlaced representation of video, a method of converting the interlaced representation of video into a progressive representation of the video by converting two interlaced fields into a progressive frame, the method comprising the following:

an act of replicating one of the interlaced fields to generate half of the progressive frame;

an act of estimating a correlation between a pixel of the other non-replicated temporal field and at least one vertically adjacent pixel of the replicated point field; and based on the correlation, an act of assigning a value to a subject pixel in the other half of the progressive frame, the subject pixel corresponding to the position of the pixel of the non-replicated temporal field.

37. In a computer system that has access to interlaced fields of video, a method of converting input fields of interlaced video into two output fields of interlaced video, the method comprising the following:

an act of replicating one of the input fields to form a first output field;

for a given output pixel having an output position in a second output field, an act of using at least one pixel of the replicated input field that is proximate to the output position of the second output field to identify a correlation between one or more non-replicated input fields and the replicated input field at the output position; and an act of assigning a value to the output pixel at least based on the correlation.

\* \* \* \* \*